United States Patent
Kazama et al.

(10) Patent No.: US 8,324,866 B2
(45) Date of Patent: Dec. 4, 2012

(54) CHARGING SYSTEM, PROCESSOR AND FEEDER

(75) Inventors: Satoshi Kazama, Kawasaki (JP); Yoshiyasu Nakashima, Kawasaki (JP); Isamu Yamada, Kawasaki (JP); Yuki Tamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 341 days.

(21) Appl. No.: 12/767,444

(22) Filed: Apr. 26, 2010

(65) Prior Publication Data

US 2010/0201306 A1    Aug. 12, 2010

Related U.S. Application Data

(63) Continuation of application No. PCT/JP2007/071009, filed on Oct. 29, 2007.

(51) Int. Cl.
*H02J 7/00* (2006.01)
*H02J 7/16* (2006.01)

(52) U.S. Cl. ........ 320/134; 320/135; 320/136; 320/137; 320/132

(58) Field of Classification Search .................. 320/134, 320/135, 136, 137, 132, 148, 149, 150, 151, 320/152, 160, 161, 162, 165
See application file for complete search history.

(56) References Cited

U.S. PATENT DOCUMENTS

| | | | | |
|---|---|---|---|---|
| 5,122,722 A | * | 6/1992 | Goedken et al. | 320/116 |
| 5,218,286 A | * | 6/1993 | VanDunk | 320/125 |
| 5,274,321 A | * | 12/1993 | Matsuda | 320/157 |
| 5,357,187 A | * | 10/1994 | Park | 320/116 |
| 5,387,857 A | * | 2/1995 | Honda et al. | 320/120 |
| 5,486,749 A | * | 1/1996 | Brainard | 320/125 |
| 5,506,490 A | | 4/1996 | DeMuro | |
| 5,600,226 A | * | 2/1997 | Falcon | 320/129 |
| 5,617,004 A | * | 4/1997 | Kaneko | 320/119 |
| 2005/0162131 A1 | | 7/2005 | Sennami et al. | |

FOREIGN PATENT DOCUMENTS

| | | |
|---|---|---|
| JP | 05-135804 | 6/1993 |
| JP | 06-225468 | 8/1994 |

(Continued)

OTHER PUBLICATIONS

Japanese Office Action issued in corresponding JP App. No. 2009-538865, dated Aug. 7, 2012 (with translation).

*Primary Examiner* — Edward Tso
*Assistant Examiner* — Alexis Boateng
(74) *Attorney, Agent, or Firm* — Greer, Burns & Crain, Ltd.

(57) ABSTRACT

A charging system including: a processor that includes a containing part for selectively containing either one of a secondary battery of a first type and a secondary battery of a second type capable of being rapidly charged with an electrical quantity greater than that of the secondary battery of the first type, and that carries out processing using, as a power source, the secondary battery contained in the containing part; and a feeder for feeding power to the processor so as to charge the secondary battery, wherein the processor includes: a determination part for determining whether or not the contained secondary battery needs to be charged; a battery detection part for detecting the type of the contained secondary battery when it is determined that the secondary battery needs to be charged; and a transmission part for transmitting, to the feeder, a feed instruction.

12 Claims, 10 Drawing Sheets

FOREIGN PATENT DOCUMENTS

| | | |
|---|---|---|
| JP | 08-019187 | 1/1996 |
| JP | 8-19187 | 1/1996 |
| JP | 8-505999 | 6/1996 |
| JP | 2645913 | 5/1997 |
| JP | 09-181799 | 7/1997 |
| JP | 2002-078223 | 3/2002 |
| JP | 2005-130663 | 5/2005 |
| JP | 2005-354874 | 12/2005 |

* cited by examiner

CHARGING SYSTEM, PROCESSOR AND FEEDER

CROSS-REFERENCE TO RELATED APPLICATIONS

This application is the continuation, filed under 35 U.S.C. §111(a), of PCT International Application No. PCT/JP2007/071009 which has an International filing date of Oct. 29, 2007 and designated the United States of America.

FIELD

The present invention relates to a charging system including a processor for carrying out processing using a secondary battery as a power source, and a feeder for feeding power to the processor to charge the secondary battery and the processor and feeder used in the charging system.

BACKGROUND

In a processor of a mobile personal computer, a mobile telephone or the like, a secondary battery such as a Ni—Cd battery or a lithium ion battery is used. Japanese Laid-open Patent Publication No. 09-181799 discloses a mobile telephone capable of being charged by a plurality of types of methods.

SUMMARY

A charging system including:

a processor that includes a containing part for selectively containing either one of a secondary battery of a first type and a secondary battery of a second type capable of being rapidly charged with an electrical quantity greater than that of the secondary battery of the first type, and that carries out processing using, as a power source, the secondary battery contained in the containing part; and a feeder for feeding power to the processor so as to charge the secondary battery, wherein the processor includes:

a determination part for determining whether or not the contained secondary battery needs to be charged;

a battery detection part for detecting the type of the contained secondary battery when it is determined that the secondary battery needs to be charged; and a transmission part for transmitting, to the feeder, a feed instruction for causing the feeder to feed power by a method corresponding to the detected type, and wherein the feeder includes a feed section for feeding power by a method corresponding to the received feed instruction.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

DESCRIPTION OF EMBODIMENTS

Embodiment 1

Figure 1:
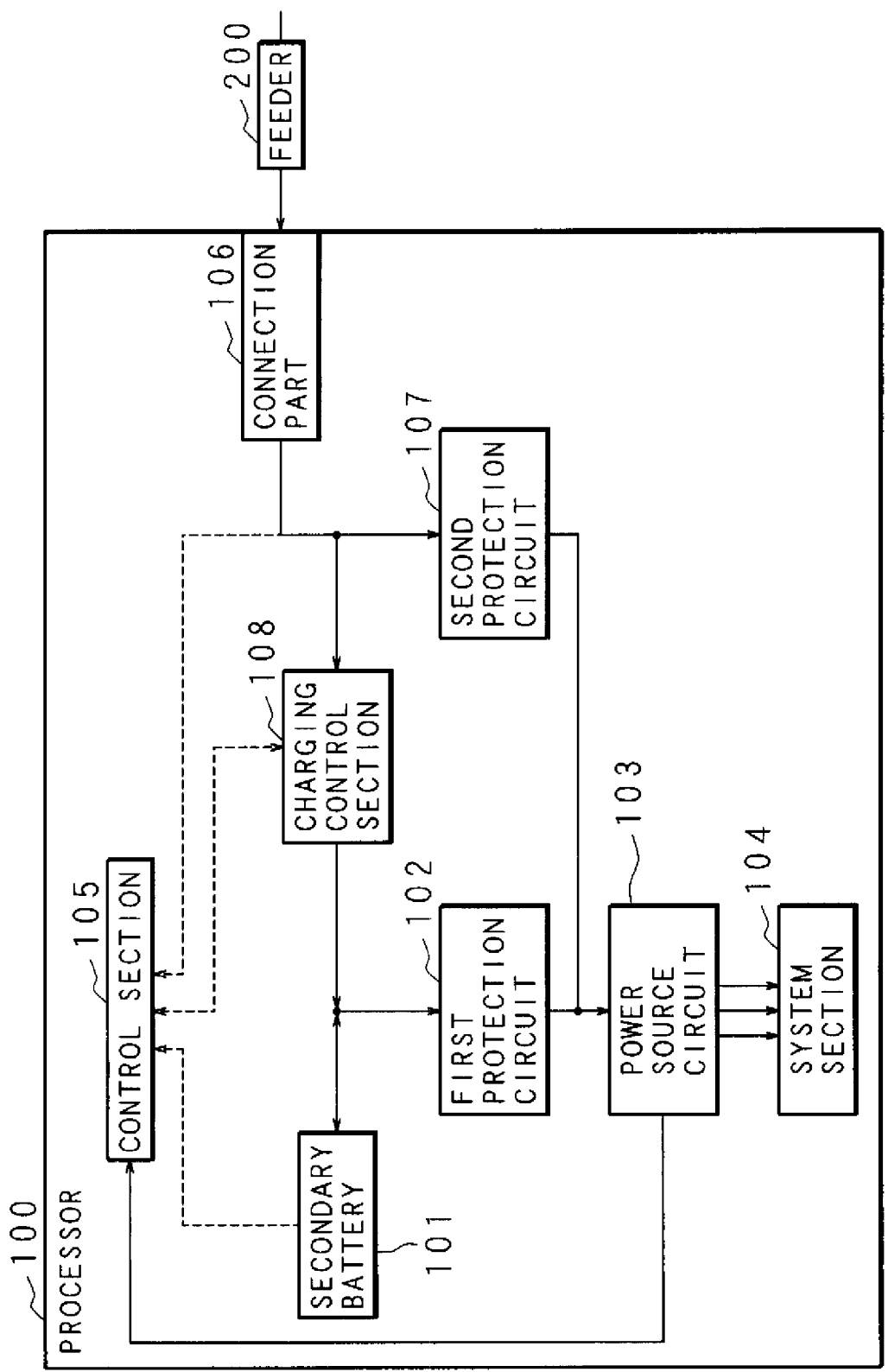
FIG. 1 is a block diagram illustrating a processor.

FIG. 1 is a block diagram illustrating a processor. In FIG. 1, the reference numeral 100 represents a processor of a mobile personal computer or the like. The processor 100 includes a secondary battery 101 such as a lithium ion battery. Power with which the secondary battery 101 is charged is supplied to a power source circuit 103 via a first protection circuit 102 including, for example, a diode for preventing backflow of an electric current. The power source circuit 103 supplies power to a system section 104 for performing main processing of the processor 100, and to a control section 105 for performing control concerning a power source. Note that arrows illustrated with solid lines, by which respective parts in the processor 100 are connected, each represent an electric path, while arrows illustrated with broken lines each represent a signal path.

Via a connection part 106 such as a connector and its accessory, the processor 100 is connected with a feeder 200 such as an AC adapter for supplying direct current power. The feeder 200 has rectifying and smoothing functions by which power supplied via a feeder line from an alternating current power source such as a domestic power source is converted into a direct current. The feeder 200 supplies direct current power to the processor 100.

The processor 100 supplies the direct current, which has been supplied from the feeder 200, to the power source circuit 103 via a second protection circuit 107. The processor 100 supplies, to the power source circuit 103, the power supplied from the secondary battery 101 or the power supplied from the feeder 200, and further supplies the power from the power source circuit 103 to the system section 104 and the control section 105.

The processor 100 further includes a charging control section 108 for performing, based on the control performed by the control section 105, charging control such as prevention of overcharging on the direct current supplied from the feeder 200, and for supplying, to the secondary battery 101, the resulting current as a charging current of about 2 A.

The processor 100 detects the voltage of the secondary battery 101 in accordance with the control by the control section 105, thereby determining whether or not the secondary battery 101 needs to be charged. When it is determined that the secondary battery 101 needs to be charged, the processor 100 detects whether or not the feeder 200 is connected. When it is determined that the feeder 200 is connected, the processor 100 charges the secondary battery 101 based on the charging control performed by the charging control section 108.

The secondary battery 101 may require a charging time of several hours with a direct current of about 2 A. At present a secondary battery capable of being rapidly charged about 80% in about one minute by supplying a high current of 100 A or more is developed.

Figure 2:
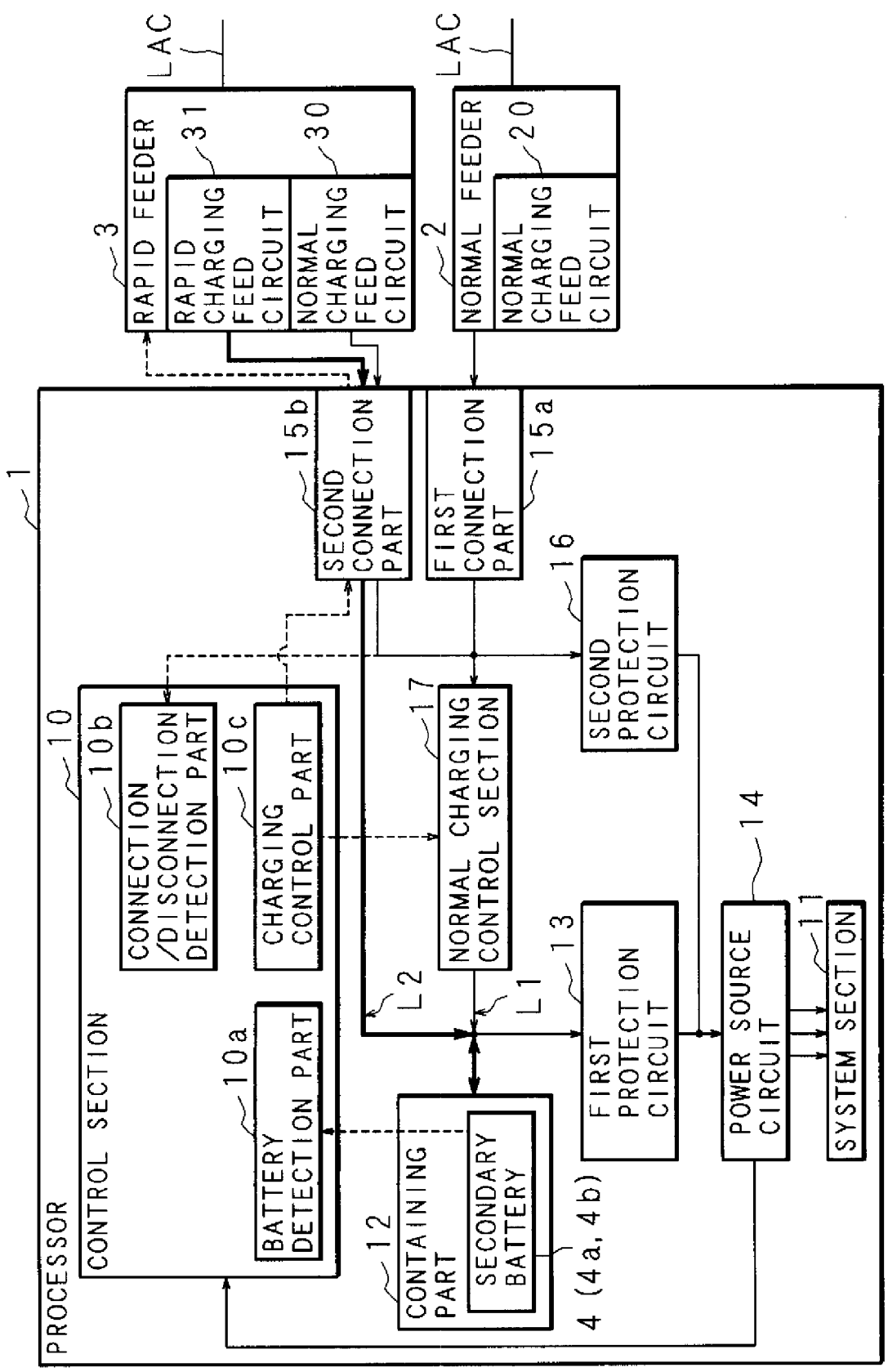
FIG. 2 is a block diagram illustrating a charging system according to Embodiment 1.

FIG. 2 is a block diagram illustrating a charging system according to Embodiment 1. A processor 1 illustrated in FIG. 2 is the processor 1 of a mobile personal computer, a mobile telephone or the like, which carries out various processes as an electronic apparatus. The processor 1 is connectable with a normal feeder 2 and a rapid feeder 3. The normal feeder 2 is capable of feeding a direct current of about 2 A for normal charging. The normal feeder 2 is an AC adapter that is generally used, for example. The rapid feeder 3 is capable of feeding a direct current of about 2 A for normal charging or a direct current of about 100 A or more for rapid charging. The rapid feeder 3 is an AC adapter adaptable to rapid charging, for example.

The processor 1 includes: a control section 10 for performing control concerning a power source; a system section 11 for performing main processing of the processor 1; and a containing part 12 capable of containing a secondary battery 4 such as a lithium ion battery. The secondary battery 4 contained in the containing part 12 is charged with a direct current supplied from the rapid feeder 3 or the normal feeder 2, and is discharged for supplying power to the control section 10 and the system section 11.

The containing part 12 selectively contains either one of the secondary battery 4 of the type adaptable to rapid charging, and the secondary battery 4 of the type that is not adaptable to rapid charging. Note that in the following description of the secondary battery 4, the secondary battery 4 of the type that is not adaptable to rapid charging will be described as a normally charged secondary battery 4a as the case may be. The secondary battery 4 of the type adaptable to rapid charging will be described as a rapidly chargeable secondary battery 4b. The rapidly chargeable secondary battery 4b is capable of being rapidly charged about 80% in one minute by feeding a direct current of about 100 A or more thereto. The rapidly chargeable secondary battery 4b is also capable of being normally charged by feeding a direct current of about 2 A thereto. In the case of normal charging, the charging of the rapidly chargeable secondary battery 4b is completed in about several hours. Although the normally charged secondary battery 4a is incapable of being rapidly charged, but is capable of being normally charged.

Power with which the secondary battery 4 is charged is supplied to a power source circuit 14 via a first protection circuit 13 including, for example, a diode for preventing backflow of an electric current. Moreover, the power source circuit 14 supplies power to devices such as the control section 10 and the system section 11, which are provided within the processor 1.

The processor 1 includes a first connection part 15a such as a connector and its accessory, through which the normal feeder 2 is connectable to the processor 1. The processor 1 further includes a second connection part 15b such as a connector and its accessory, through which the rapid feeder 3 is connectable to the processor 1.

The processor 1 supplies the direct current for normal charging, fed from the normal feeder 2 or the rapid feeder 3, to the power source circuit 14 via a second protection circuit 16 including a diode or the like. The power source circuit 14 supplies power to the control section 10 and the system section 11. In this manner, the processor 1 supplies, to the power source circuit 14, power supplied from the secondary battery 4 or power fed from the rapid feeder 3 or the normal feeder 2. The processor 1 supplies power from the power source circuit 14 to internal devices such as the control section 10 and the system section 11.

The processor 1 further includes a normal charging control section 17 for performing charging control such as prevention of overcharging on the direct current for normal charging supplied from the rapid feeder 3 or the normal feeder 2, and for supplying the resulting current to the secondary battery 4. Note that a charging control section for rapid charging is included in the rapid feeder 3 as will be described later and therefore does not have to be included in the processor 1.

Arrows illustrated with thin solid lines in FIG. 2 each represent a first electric path L1 through which a low current for normal charging passes. Arrows illustrated with thick solid lines in FIG. 2 each represent a second electric path L2 which is provided within the processor 1 and through which a high current for rapid charging is allowed to pass. A current for normal charging is allowed to flow through the second electric path L2. However, a current for rapid charging is not allowed to flow through the electric path L1. Therefore, an unillustrated overcurrent flow prevention circuit is provided at a zone where the first and second electric paths L1 and L2 come into contact with each other. Furthermore, arrows illustrated with dotted lines in FIG. 2 each represent a signal path.

The control section 10 included in the processor 1 includes a battery detection part 10a for detecting the remaining amount of the secondary battery 4 (i.e., for detecting the voltage of the secondary battery 4 as remaining power thereof, for example), for detecting, from the detected remaining amount, whether or not the secondary battery 4 needs to be charged, and for detecting the type of the secondary battery 4. The processor 1 further includes a connection/disconnection (connection or disconnection) detection part 10b for detecting whether or not the rapid feeder 3 is connected to the second connection part 15b, and whether or not the normal feeder 2 is connected to the first connection part 15a. The processor 1 further includes a charging control part 10c for transmitting a control instruction so as to control the normal charging control section 17 and a charging circuit for rapid charging included in the rapid feeder 3. The respective circuits such as the battery detection part 10a, the connection/disconnection detection part 10b and the charging control part 10c may be implemented as software such as firmware executed in the control section 10.

The normal feeder 2 has rectifying and smoothing functions by which power supplied via a feeder line LAC from an alternating current power source such as a domestic power source is converted into a direct current. Furthermore, the normal feeder 2 includes a normal charging feed circuit 20 for supplying a direct current for normal charging. The rapid feeder 3 has rectifying and smoothing functions by which power supplied via a feeder line LAC from an alternating current power source such as a domestic power source is converted into a direct current. Furthermore, the rapid feeder 3 includes a normal charging feed circuit 30 for supplying a direct current for normal charging. The rapid feeder 3 further includes a rapid charging feed circuit 31 for supplying a direct current on which charging control has been performed for rapid charging.

Figure 3:
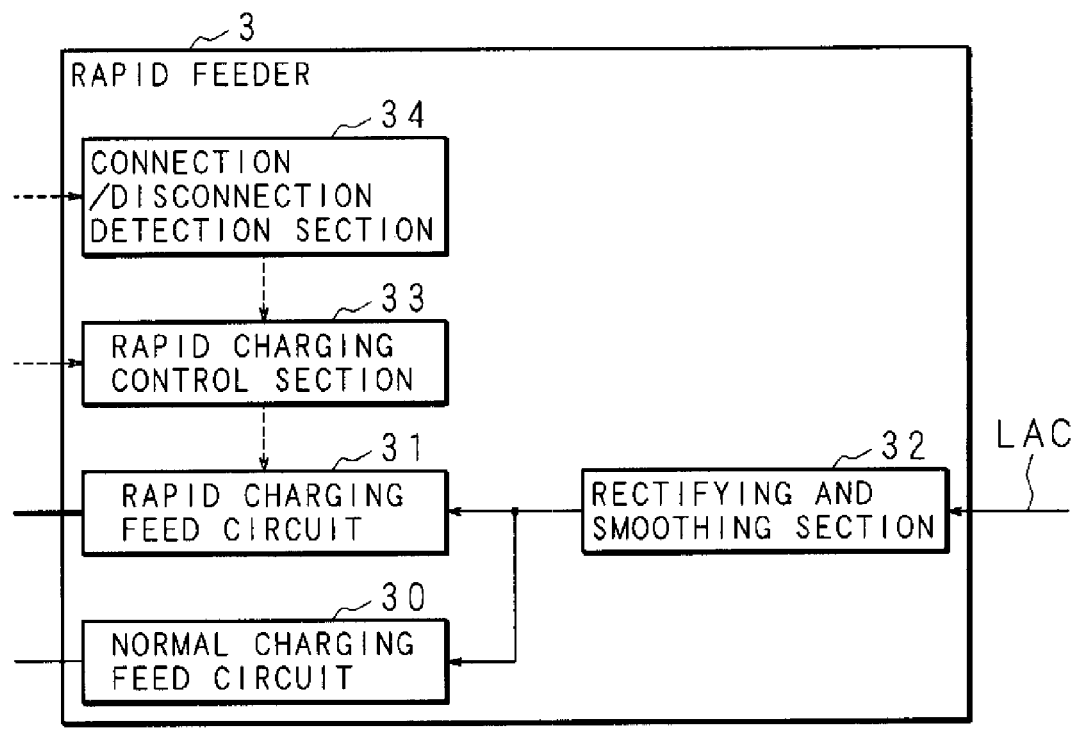
FIG. 3 is a block diagram illustrating a rapid feeder used in the charging system according to Embodiment 1.

FIG. 3 is a block diagram illustrating the rapid feeder 3 used in the charging system according to Embodiment 1. The rapid feeder 3 illustrated in FIG. 3 is connected with a feeder line LAC from an alternating current power source such as a domestic power source. The rapid feeder 3 includes a rectifying and smoothing section 32 having rectifying and smoothing functions for rectifying and smoothing power supplied through the feeder line LAC. The rectifying and smoothing section 32 outputs the rectified and smoothed direct current power to the normal charging feed circuit 30 and the rapid charging feed circuit 31. The rapid charging feed circuit 31 is controlled by a rapid charging control section 33 for performing charging control such as prevention of overcharging, and supplies a direct current of 100 A or more to the processor 1 based on the power inputted from the rectifying and smoothing section 32. The rapid charging control section 33 performs control for starting rapid charging based on a rapid charging start instruction received from the charging control part 10c of the processor 1. The rapid feeder 3 further includes a connection/disconnection detection section 34 for detecting a connected/disconnected state between the rapid feeder 3 and the processor 1, i.e., whether or not the rapid feeder 3 is connected to the processor 1.

When connected to the processor 1, the normal charging feed circuit 30 supplies a direct current of about 2 A to the processor 1. As mentioned above, the processor 1 performs control for normal charging by the normal charging control section 17 within the processor 1. Note that a configuration in which an alternating current is converted into a direct current and is then transformed by the normal charging feed circuit 30 and the rapid charging feed circuit 31 has been described in this embodiment, but an alternating current may alternatively be transformed and then converted into a direct current. The normal feeder 2 includes the normal charging feed circuit 20 and an unillustrated rectifying and smoothing section.

Figure 4:
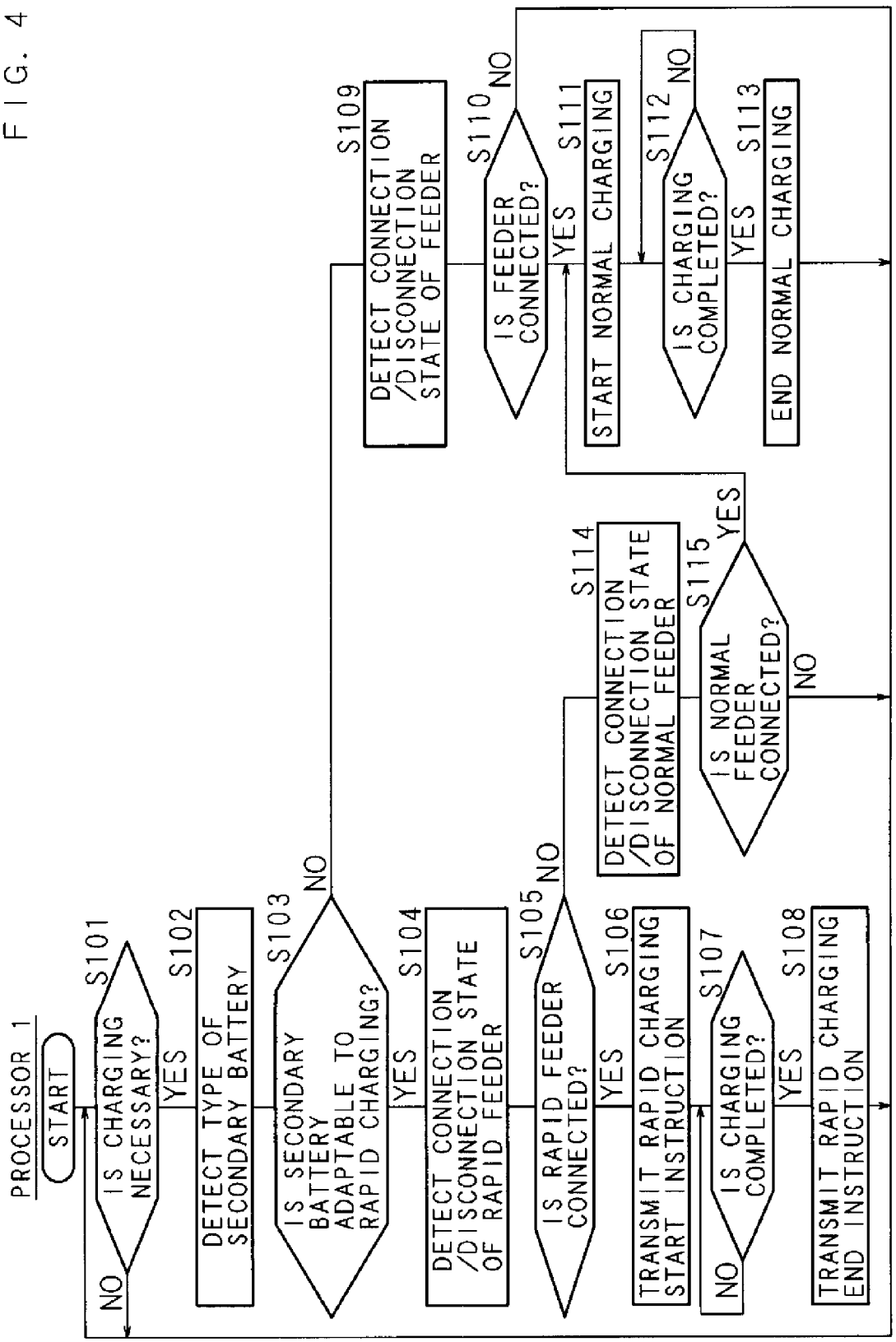
FIG. 4 represents a flow chart illustrating an example of processing carried out by the processor of the charging system according to Embodiment 1.

Next, processing carried out by the charging system according to Embodiment 1 will be described. When the rapid feeder 3 is connected to the processor 1 at the start-up of the processor 1, the rapid feeder 3 suspends the feeding of power from the rapid charging feed circuit 31 in accordance with the control by the rapid charging control section 33. The control is performed so that power is fed from only the normal charging feed circuit 30. FIG. 4 represents a flow chart illustrating an example of processing carried out by the processor 1 of the charging system according to Embodiment 1. In accordance with the control by the battery detection part 10a of the control section 10, the processor 1 detects the voltage of the secondary battery 4 as remaining power thereof, and determines, from the detected remaining power, whether or not the secondary battery 4 needs to be charged (S101).

When it is determined in Step S101 that the secondary battery 4 needs to be charged (S101: YES), the processor 1 detects the type of the secondary battery 4, contained in the containing part 12, in accordance with the control by the battery detection part 10a of the control section 10 (S102). The processor 1 determines whether or not the type of the secondary battery 4 detected is adaptable to rapid charging (S103). In Step S103, it is determined whether or not the secondary battery 4 contained in the containing part 12 is the rapidly chargeable secondary battery 4b. Note that when it is determined in Step S101 that the secondary battery 4 does not need to be charged (S101: NO), the processor 1 carries out the process of Step S101 again after a lapse of a given time.

When it is determined in Step S103 that the type of the secondary battery 4 is the rapidly chargeable secondary battery 4b adaptable to rapid charging (S103: YES), the processing of the processor 1 proceeds to Step S104. In accordance with the control by the connection/disconnection detection part 10b of the control section 10, the processor 1 detects the connected/disconnected state between the second connection part 15b and the rapid feeder 3 (S104). From the detected connected/disconnected state, the processor 1 determines whether or not the rapid feeder 3 is connected to the second connection part 15b (S105).

When it is determined in Step S105 that the rapid feeder 3 is connected to the second connection part 15b (S105: YES), the processor 1 transmits a rapid charging start instruction, serving as a control instruction for starting rapid charging, to the rapid feeder 3 in accordance with the control by the charging control part 10c of the control section 10 (S106). Based on the received rapid charging start instruction, the rapid feeder 3 starts the feeding of power from the rapid charging feed circuit 31 in accordance with the control by the rapid charging control section 33.

In accordance with the control by the battery detection part 10a of the control section 10, the processor 1 detects the voltage of the rapidly chargeable secondary battery 4b, and determines whether or not a given amount of charging is completed (S107). In Step S107, a fully charged state, in which the rapidly chargeable secondary battery 4b is charged to 100% of its storage capacity, may be determined as the given amount of charging. Alternatively, in Step S107, a state in which the rapidly chargeable secondary battery 4b is charged 80% or more may be determined as the given amount of charging in consideration of the rapid charging.

When it is determined in Step S107 that the given amount of charging is completed (S107: YES), the processor 1 transmits a rapid charging end instruction, serving as a control instruction for ending the rapid charging, to the rapid feeder 3 in accordance with the control by the charging control part 10c of the control section 10 (S108). Then, the processing of the processor 1 returns to Step S101, and the subsequent processes are repeated. Based on the received rapid charging end instruction, the rapid feeder 3 ends the feeding of power from the rapid charging feed circuit 31 in accordance with the control by the rapid charging control section 33. Note that when it is determined in Step S107 that the given amount of charging is not completed (S107: NO), the processor 1 carries out the process of Step S107 again after a lapse of a given time.

When it is determined in Step S103 that the specifications of the secondary battery 4 are those of the normally charged secondary battery 4a not adaptable to rapid charging (S103: NO), the processing proceeds to Step S109. In accordance with the control by the connection/disconnection detection part 10b of the control section 10, the processor 1 detects the connected/disconnected state between the first connection part 15a and the normal feeder 2, and the connected/disconnected state between the second connection part 15b and the rapid feeder 3 (S109). From the detected connected/disconnected state, the processor 1 determines whether or not at least either one of the normal feeder 2 and the rapid feeder 3 is connected to the processor 1 (S110).

When it is determined in Step S110 that at least either one of the normal feeder 2 and the rapid feeder 3 is connected to the processor 1 (S110: YES), the processor 1 causes the normal charging control section 17 to start normal charging in accordance with the control by the charging control part 10c of the control section 10 (S111). In response to the start of charging control concerning the normal charging by the normal charging control section 17, charging performed by the feeding of power from the normal feeder 2 or the rapid feeder 3 starts.

In accordance with the control by the battery detection part 10a of the control section 10, the processor 1 detects the voltage of the secondary battery 4, and determines whether or not the given amount of charging is completed (S112).

When it is determined in Step S112 that the given amount of charging is completed (S112: YES), the processing proceeds to Step S113. In accordance with the control by the charging control part 10c of the control section 10, the processor 1 causes the normal charging control section 17 to end the normal charging (S113). Then, the processing of the processor 1 returns to Step S101, and the subsequent processes are repeated. Note that when it is determined in Step S112 that the given amount of charging is not completed (S112: NO), the processor 1 carries out the process of Step S112 again after a lapse of a given time.

When it is determined in Step S105 that the rapid feeder 3 is not connected to the second connection part 15b (S105: NO), the processing proceeds to Step S114. In accordance with the control by the connection/disconnection detection part 10b of the control section 10, the processor 1 detects the connection/disconnection state between the first connection part 15a and the normal feeder 2 (S114). From the detected connection/disconnection state, the processor 1 determines whether or not the normal feeder 2 is connected to the first connection part 15a (S115).

When it is determined in Step S115 that the normal feeder 2 is connected to the first connection part 15a (S115: YES), the processing proceeds to Step S111. In accordance with the control by the charging control part 10c of the control section 10, the processor 1 causes the normal charging control section 17 to start normal charging (S111). In response to the start of charging control concerning the normal charging by the normal charging control section 17, charging performed by the feeding of power from the normal feeder 2 starts.

When it is determined in Step S110 that neither the normal feeder 2 nor the rapid feeder 3 is connected to the processor 1 (S110: NO), the processing of the processor 1 proceeds to Step S101, and the subsequent processes are repeated. In this manner, the processor 1 carries out the processing concerning charging.

Figure 5:
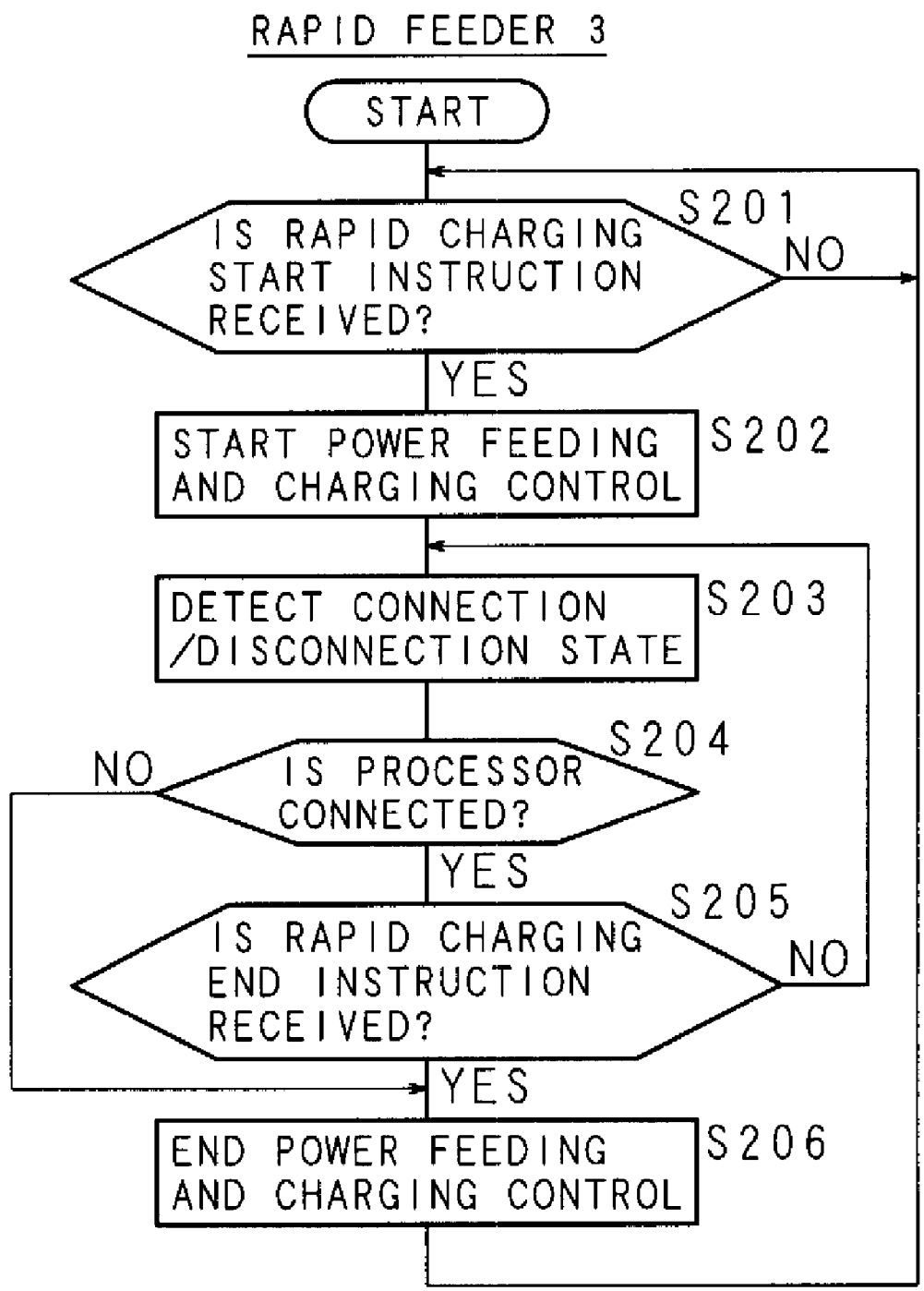
FIG. 5 is a flow chart illustrating an example of processing carried out by the rapid feeder of the charging system according to Embodiment 1.

FIG. 5 is a flow chart illustrating an example of processing carried out by the rapid feeder 3 of the charging system according to Embodiment 1. When the connection of the rapid feeder 3 with the processor 1 is detected by the connection/disconnection detection section 34, the rapid feeder 3 starts the feeding of power from the normal charging feed circuit 30. As described above, the rapid feeder 3 constantly feeds power from the normal charging feed circuit 30 while the rapid feeder 3 is connected to the processor 1. Furthermore, in accordance with the control by the rapid charging control section 33, the rapid feeder 3 determines whether or not the rapid charging start instruction, serving as a control instruction for starting rapid charging, is received from the processor 1 (S201). The rapid charging start instruction, which is an object to be determined in Step S201, is the control instruction transmitted from the processor 1 to the rapid feeder 3 in the process of Step S106 illustrated in FIG. 4.

When it is determined in Step S201 that the rapid charging start instruction is received (S201: YES), the rapid feeder 3 starts the feeding of power from the rapid charging feed circuit 31 and charging control in accordance with the control by the rapid charging control section 33 (S202). Note that when it is determined in Step S201 that no rapid charging start instruction is received (S201: NO), the rapid feeder 3 carries out the process of Step S201 again after a lapse of a given time.

Then, in accordance with the control by the rapid charging control section 33, the rapid feeder 3 detects the connection/disconnection state between the rapid feeder 3 and the processor 1 by the connection/disconnection detection section 34 (S203). Based on the detected connection/disconnection state, the rapid feeder 3 determines whether or not the rapid feeder 3 is connected to the processor 1 (S204).

When it is determined in Step S204 that the rapid feeder 3 is connected to the processor 1 (S204: YES), the rapid feeder 3 determines whether or not the rapid charging end instruction, serving as a control instruction for ending the rapid charging, is received from the processor 1 in accordance with the control by the rapid charging control section 33 (S205). The rapid charging end instruction, which is an object to be determined in Step S205, is the control instruction transmitted from the processor 1 to the rapid feeder 3 in the process of Step S108 illustrated in FIG. 4.

When it is determined in Step S205 that the rapid charging end instruction is received (S205: YES), the rapid feeder 3 ends the feeding of power from the rapid charging feed circuit 31 and the charging control in accordance with the control by the rapid charging control section 33 (S206). Then, the processing of the rapid feeder 3 proceeds to Step S201, and the subsequent processes are repeated.

When it is determined in Step S204 that the rapid feeder 3 is disconnected from the processor 1 and not connected thereto (S204: NO), the processing of the rapid feeder 3 proceeds to Step S206 in accordance with the control by the rapid charging control section 33. The rapid feeder 3 ends the feeding of power from the rapid charging feed circuit 31 and the charging control (S206). Then, the processing of the rapid feeder 3 proceeds to Step S201, and the subsequent processes are repeated. Even when the rapid feeder 3 is detached at the time of the rapid charging during which a high current is outputted, the feeding of power is automatically ended, thereby enabling the prevention of an accident such as an electric shock.

When it is determined in Step S205 that no rapid charging end instruction is received (S205: NO), the processing of the rapid feeder 3 proceeds to Step S203 in accordance with the control by the rapid charging control section 33, and the subsequent processes are repeated. In this manner, the rapid feeder 3 carries out the processing concerning the rapid charging. Thus, the feeder starts the feeding of power by a method corresponding to rapid charging after a feed instruction has been received, thereby enabling avoidance of the danger of feeding of a large electrical quantity to the processor side, which is not in a power-receiving state.

Embodiment 2

Figure 6:
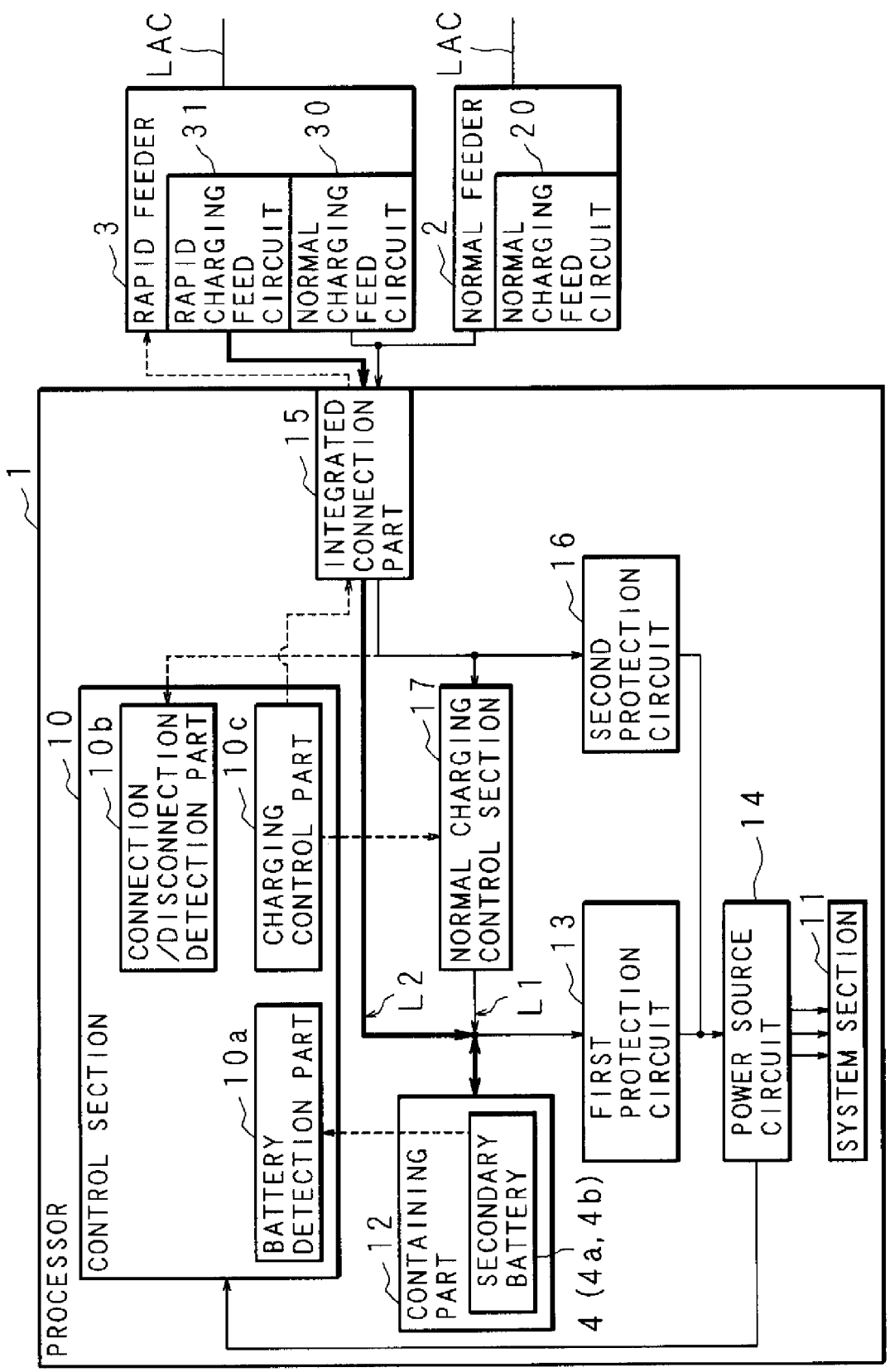
FIG. 6 is a block diagram illustrating a charging system according to Embodiment 2.

Embodiment 2 is based on Embodiment 1, but in Embodiment 2, there is provided a configuration in which a processor is provided with a single integrated connection part into which the first and second connection parts are integrated. FIG. 6 is a block diagram illustrating a charging system according to Embodiment 2. In the following description of Embodiment 2, parts similar to those of Embodiment 1 are identified by the same reference characters as those of Embodiment 1, and the description thereof will be omitted.

The processor 1 according to Embodiment 2 includes an integrated connection part 15 such as a connector and its accessory, into which the first and second connection parts 15a and 15b are integrated. The integrated connection part 15 is connectable with either one of the normal feeder 2 and the rapid feeder 3. In Embodiment 2, the single connection part, which includes a connector, is provided in this manner, and therefore, the convenience of a user is enhanced. Since other features of Embodiment 2 are similar to those of Embodiment 1, reference may be made to Embodiment 1 as appropriate, and the description thereof will be omitted. Since the rapid feeder 3 according to Embodiment 2 is similar to the rapid feeder 3 according to Embodiment 1, reference may be made to Embodiment 1 as appropriate, and the description thereof will be omitted.

Figure 7:
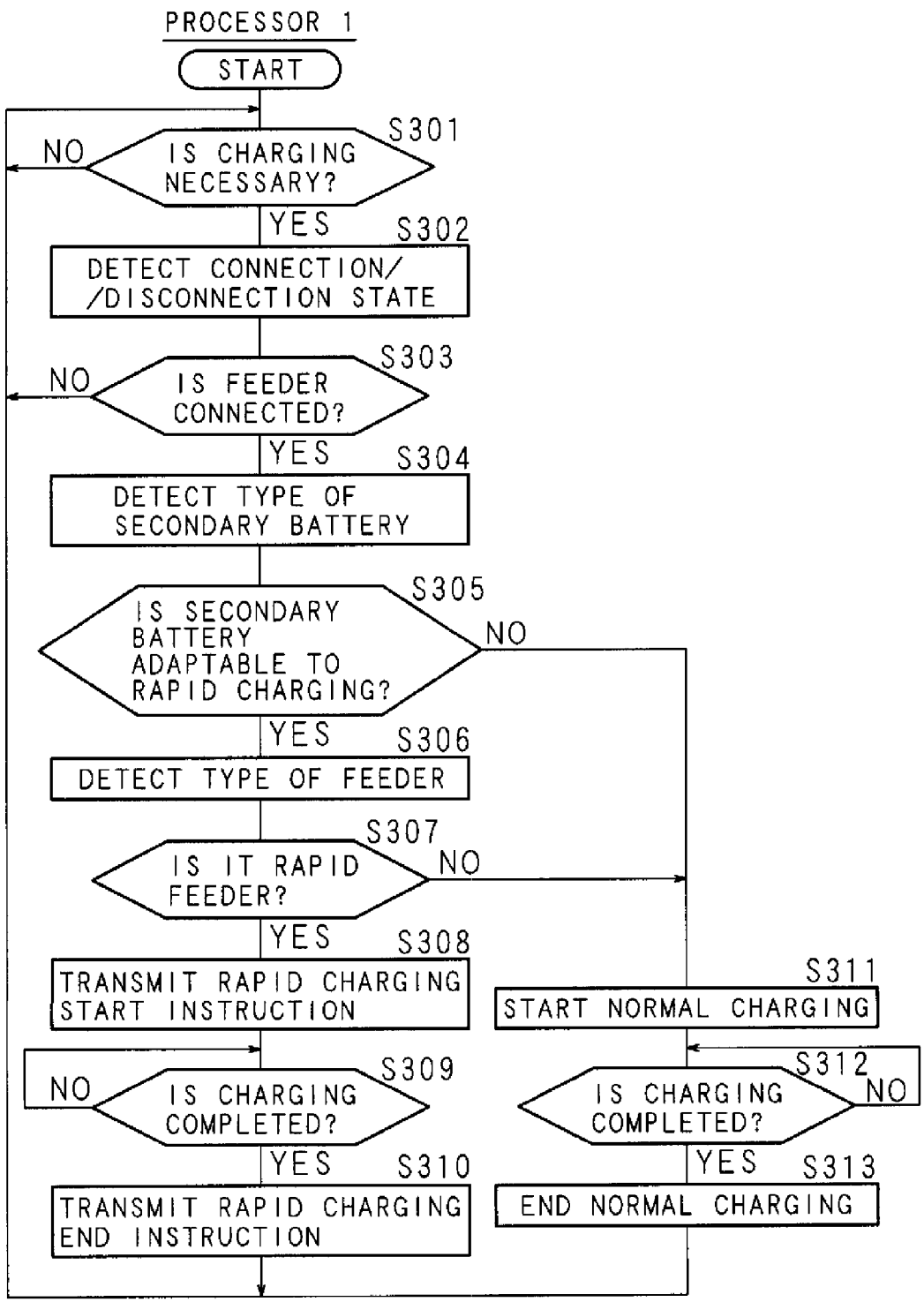
FIG. 7 represents a flow chart illustrating an example of processing carried out by the processor of the charging system according to Embodiment 2.

Next, processing carried out by the charging system according to Embodiment 2 will be described. FIG. 7 represents a flow chart illustrating an example of processing carried out by the processor 1 of the charging system according to Embodiment 2. In accordance with the control by the battery detection part 10a of the control section 10, the processor 1 determines whether or not the secondary battery 4 needs to be charged (S301).

When it is determined in Step S301 that the secondary battery 4 needs to be charged (S301: YES), the processor 1 detects the connection/disconnection state between the integrated connection part 15 and the feeder in accordance with the control by the connection/disconnection detection part 10b of the control section (S302). From the detected connected/disconnected state, the processor 1 determines whether or not either one of the normal feeder 2 and the rapid feeder 3 is connected to the integrated connection part 15 (S303). Note that when it is determined in Step S301 that the secondary battery 4 does not need to be charged (S301: NO), the processor 1 carries out the process of Step S301 again after a lapse of a given time.

When it is determined in Step S303 that either one of the feeders is connected to the integrated connection part 15 (S303: YES), the type of the secondary battery 4 contained in the containing part 12 is detected in accordance with the control by the battery detection part 10a of the control section 10 (S304). The control section 10 determines whether or not the type of the secondary battery 4 detected is adaptable to rapid charging (S305). Note that when it is determined in Step S303 that neither feeder is connected to the integrated connection part 15 (S303: NO), the processor 1 carries out the process of Step S301 again after a lapse of a given time.

When it is determined in Step S305 that the type of the secondary battery 4 is the rapidly chargeable secondary battery 4b adaptable to rapid charging (S305: YES), the processor 1 detects the type of the connected feeder in accordance with the control by the connection/disconnection detection part 10b of the control section 10 (S306). The processor 1 determines whether or not the type of the connected feeder is the rapid feeder 3 capable of performing rapid charging (S307). The detection in Step S306 is carried out by the connection/disconnection detection part 10b using a method including the detection of the level of a voltage from the electric path L1 and the giving and receiving of a signal based on the power line communication via the electric path L1.

When it is determined in Step S307 that the rapid feeder 3 is connected to the integrated connection part 15 (S307: YES), the processor 1 transmits a rapid charging start instruction, serving as a control instruction for starting rapid charging, to the rapid feeder 3 in accordance with the control by the charging control part 10c of the control section 10 (S308).

In accordance with the control by the battery detection part 10a of the control section 10, the processor 1 detects the voltage of the rapidly chargeable secondary battery 4b, and determines whether or not a given amount of charging is completed (S309).

When it is determined in Step S309 that the given amount of charging is completed (S309: YES), the processor 1 transmits a rapid charging end instruction, serving as a control instruction for ending the rapid charging, to the rapid feeder 3 in accordance with the control by the charging control part 10c of the control section 10 (S310). Then, the processing of the processor 1 returns to Step S301, and the subsequent processes are repeated. Note that when it is determined in Step S309 that the given amount of charging is not completed (S309: NO), the processor 1 carries out the process of Step S309 again after a lapse of a given time.

When it is determined in Step S305 that the specifications of the secondary battery 4 are those of the normally charged secondary battery 4a not adaptable to rapid charging (S305: NO), the processor 1 causes the normal charging control section 17 to start normal charging in accordance with the control by the charging control part 10c of the control section 10 (S311).

In accordance with the control by the battery detection part 10a of the control section 10, the processor 1 detects the voltage of the secondary battery 4, and determines whether or not the given amount of charging is completed (S312).

When it is determined in Step S312 that the given amount of charging is completed (S312: YES), the processor 1 causes the normal charging control section 17 to end the normal charging in accordance with the control by the charging control part 10c of the control section 10 (S313). Then, the processing of the processor 1 returns to Step S301, and the subsequent processes are repeated. Note that when it is determined in Step S312 that the given amount of charging is not completed (S312: NO), the processor 1 carries out the process of Step S312 again after a lapse of a given time.

When it is determined in Step S307 that the rapid feeder 3 is not connected to the integrated connection part 15 (S307: NO), the processing of the processor 1 proceeds to Step S311 in accordance with the control by the control section 10 to start normal charging, and the subsequent processes are carried out. In this manner, the processor 1 carries out the processing concerning charging.

Since processing of the rapid feeder 3 according to Embodiment 2 is similar to that of the rapid feeder 3 according to Embodiment 1, reference may be made to Embodiment 1 as appropriate, and the description thereof will be omitted.

Embodiment 3

Figure 8:
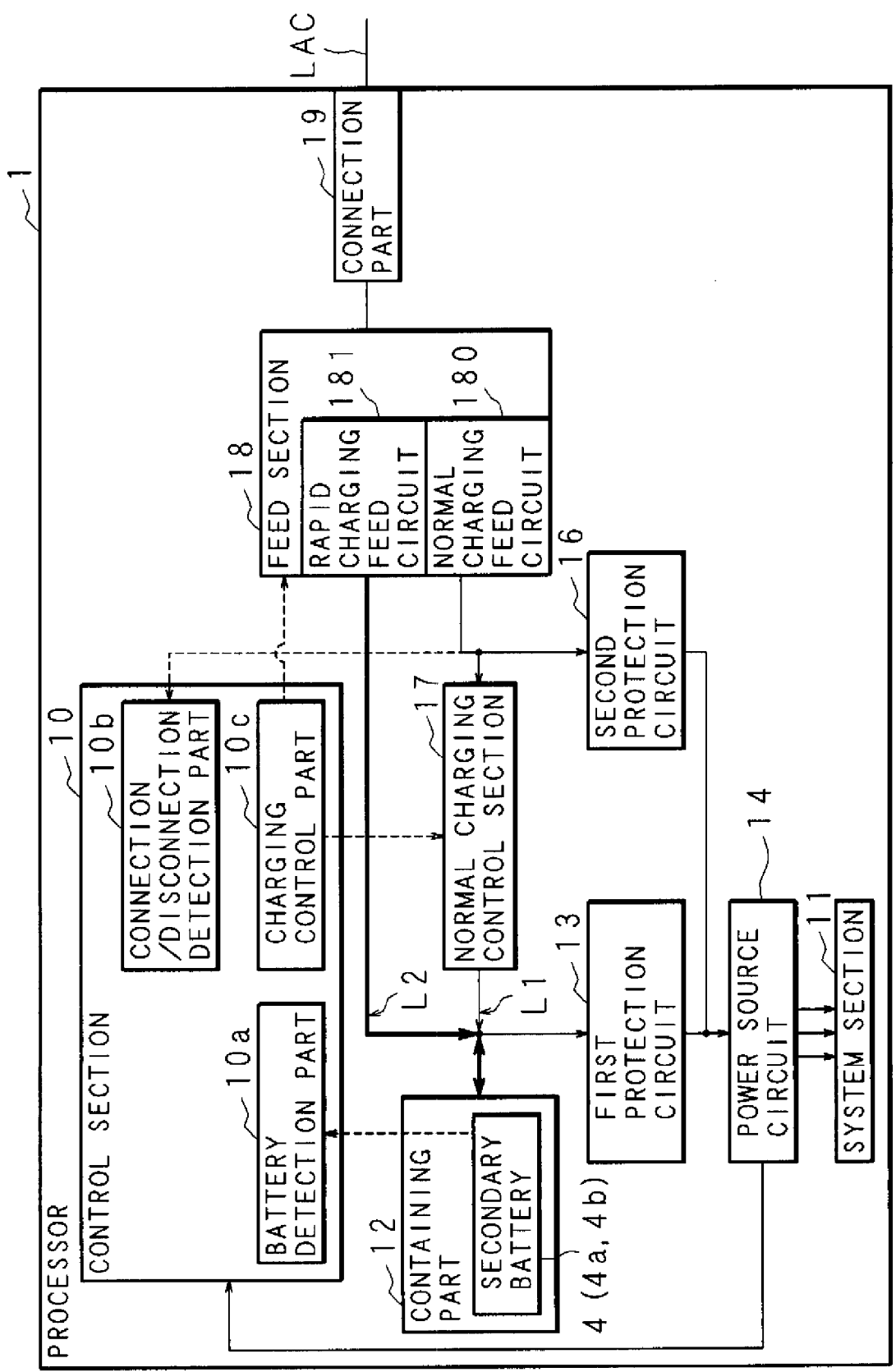
FIG. 8 is a block diagram illustrating a charging system according to Embodiment 3.

Embodiment 3 is based on Embodiment 1, but in Embodiment 3, there is provided a configuration in which the functions of the rapid charging feed circuit are included in the processor. FIG. 8 is a block diagram illustrating a charging system according to Embodiment 3. In the following description of Embodiment 3, parts similar to those of Embodiment 1 are identified by the same reference characters as those of Embodiment 1, and the description thereof will be omitted.

The processor 1 according to Embodiment 3 includes a feed section 18 having functions similar to those of the rapid feeder according to Embodiment 1. The feed section 18 includes a normal charging feed circuit 180 and a rapid charging feed circuit 181. The processor 1 according to Embodiment 3 further includes a connection part 19 such as a connector and its accessory. The connection part 19 included in the processor 1 according to Embodiment 3 serves to connect with a feeder line LAC from an alternating current power source such as a domestic power source. A connector may be used as the connection part 19.

Figure 9:
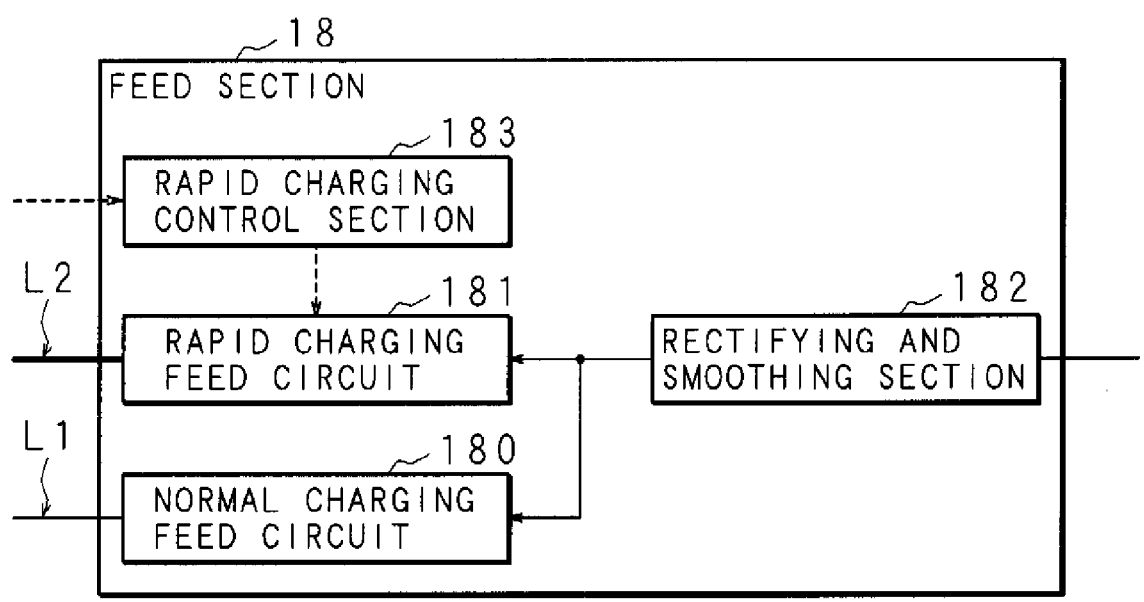
FIG. 9 is a block diagram illustrating a feed section included in a processor according to Embodiment 3.

FIG. 9 is a block diagram illustrating the feed section 18 included in the processor 1 according to Embodiment 3. Similarly to the rapid feeder 3 according to Embodiment 1, the feed section 18 according to Embodiment 3 includes the normal charging feed circuit 180, the rapid charging feed circuit 181, a rectifying and smoothing section 182, and a rapid charging control section 183. Note that since the feed section 18 according to Embodiment 3 is included in the processor 1, no connection/disconnection detection section is necessary.

Figure 10:
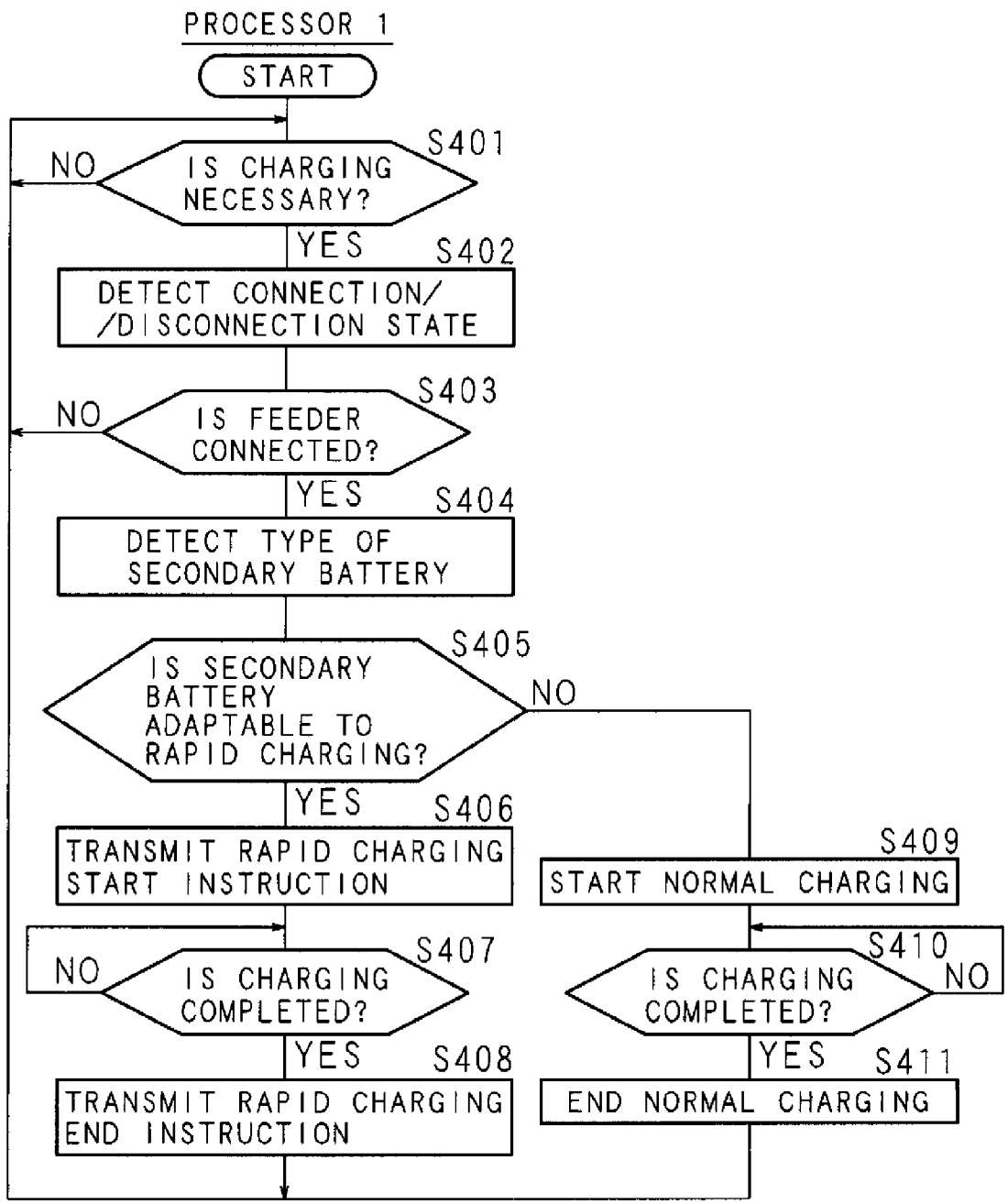
FIG. 10 represents a flow chart illustrating an example of processing carried out by the processor of the charging system according to Embodiment 3.

Next, processing carried out by the charging system according to Embodiment 3 will be described. FIG. 10 represents a flow chart illustrating an example of processing carried out by the processor 1 of the charging system according to Embodiment 3. In accordance with the control by the battery detection part 10a of the control section 10, the processor 1 detects the remaining amount of the secondary battery 4 (i.e., detects the voltage of the secondary battery 4 as remaining power thereof, for example), and determines, from the detected remaining power of the secondary battery 4, whether or not the secondary battery 4 needs to be charged (S401).

When it is determined in Step S401 that the secondary battery 4 needs to be charged (S401: YES), the processor 1 detects the connected/disconnected state between the connection part 19 and the feeder line LAC from the alternating current power source in accordance with the control by the connection/disconnection detection part 10b of the control section 10 (S402). From the detected connected/disconnected state, the processor 1 determines whether or not the feeder line LAC is connected to the connection part 19 (S403). Note that when it is determined in Step S401 that the secondary battery 4 does not need to be charged (S401: NO), the processor 1 carries out the process of Step S401 again after a lapse of a given time. Furthermore, the connection/disconnection detection part 10b performs the detection of the connection/disconnection state in Step S402 by detecting the level of a voltage from the electric path L1 and detecting the energization state for the feed section 18.

When it is determined in Step S403 that the feeder line LAC is connected to the connection part 19 (S403: YES), the processor 1 detects the type of the secondary battery 4, contained in the containing part 12, in accordance with the control by the battery detection part 10a of the control section 10 (S404). The processor 1 determines whether or not the type of the secondary battery 4 detected is adaptable to rapid charging (S405). Note that when it is determined in Step S403 that the feeder line LAC is not connected to the connection part 19 (S403: NO), the processor 1 carries out the process of Step S401 again after a lapse of a given time.

When it is determined in Step S405 that the type of the secondary battery 4 is the rapidly chargeable secondary battery 4b adaptable to rapid charging (S405: YES), the processor 1 outputs a rapid charging start instruction, serving as a control instruction for starting rapid charging, to the feed section 18 in accordance with the control by the charging control part 10c of the control section 10. The processor 1 causes the rapid charging feed circuit 181 to start the rapid charging in accordance with the control by the rapid charging control section 183 (S406).

In accordance with the control by the battery detection part 10a of the control section 10, the processor 1 detects the voltage of the rapidly chargeable secondary battery 4b, and determines whether or not a given amount of charging is completed (S407).

When it is determined in Step S407 that the given amount of charging is completed (S407: YES), the processor 1 outputs a rapid charging end instruction, serving as a control instruction for ending the rapid charging, to the feed section 18 in accordance with the control by the charging control part 10c of the control section 10. In accordance with the control by the rapid charging control section 183, the processor 1 ends the rapid charging from the rapid charging feed circuit 181 (S408). Then, the processing returns to Step S401, and the subsequent processes are repeated. Note that when it is determined in Step S407 that the given amount of charging is not completed (S407: NO), the processor 1 carries out the process of Step S407 again after a lapse of a given time.

When it is determined in Step S405 that the specifications of the secondary battery 4 are those of the normally charged secondary battery 4a not adaptable to rapid charging (S405: NO), the processing proceeds to Step S409. The processor 1 causes the normal charging control section 17 to start normal charging in accordance with the control by the charging control part 10c of the control section 10 (S409).

In accordance with the control by the battery detection part 10a of the control section 10, the processor 1 detects the voltage of the secondary battery 4, and determines whether or not the given amount of charging is completed (S410).

When it is determined in Step S410 that the given amount of charging is completed (S410: YES), the processor 1 causes the normal charging control section 17 to end the normal charging in accordance with the control by the charging control part 10c of the control section 10 (S411). Then, the processing of the processor 1 returns to Step S401, and the subsequent processes are repeated. Note that when it is determined in Step S410 that the given amount of charging is not completed (S410: NO), the processor 1 carries out the process of Step S410 again after a lapse of a given time.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A charging system comprising:
a processor that includes a containing part for selectively containing either one of a secondary battery of a first type and a secondary battery of a second type capable of being rapidly charged with an electrical quantity greater than that of the secondary battery of the first type, and that carries out processing using, as a power source, the secondary battery contained in the containing part; and
a feeder for feeding power to the processor so as to charge the secondary battery,
wherein the processor includes:
a determination part for determining whether or not the contained secondary battery needs to be charged;
a battery detection part for detecting the type of the contained secondary battery when it is determined that the secondary battery needs to be charged; and
a transmission part for transmitting, to the feeder, a feed instruction for causing the feeder to feed power by a method corresponding to the detected type, and
wherein the feeder includes a feed section for feeding power by a method corresponding to the received feed instruction.

2. The charging system according to claim 1,
wherein the processor is connectable with a feeder capable of feeding power by a method corresponding to rapid charging, and a feeder incapable of feeding power by the method corresponding to rapid charging, wherein the processor further includes a device detection part for detecting a connection or disconnection state of the feeder and the type of the connected feeder, and wherein the transmission part transmits a feed instruction for performing rapid charging when the battery detection part has detected that the secondary battery of the second type is contained and the device detection part has detected that the feeder capable of feeding power by the method corresponding to rapid charging is connected.

3. The charging system according to claim 1, wherein the feeder capable of feeding power by the method corresponding to rapid charging further includes:

a rectifying section;

a first feed section for feeding a direct current corresponding to the first type;

a second feed section for feeding a direct current corresponding to the second type; and a control section for controlling charging performed by feeding of power from the second feed section, and wherein the processor further includes a control section for controlling charging performed by feeding of power from the first feed section.

4. A processor for carrying out processing using a secondary battery as a power source, the processor comprising:

a containing part for containing either one of a secondary battery of a first type and a secondary battery of a second type capable of being rapidly charged with an electrical quantity greater than that of the secondary battery of the first type;

a connection part for connecting with a feeder for feeding power so as to charge the secondary battery;

a determination part for determining whether or not the contained secondary battery needs to be charged;

a detection part for detecting the type of the secondary battery when it is determined that the secondary battery needs to be charged; and a transmission part for transmitting, to the feeder, a feed instruction for causing the feeder to feed power by a method corresponding to the detected type.

5. A feeder for feeding power to a processor, which carries out processing using a secondary battery as a power source, so as to charge the secondary battery, the feeder comprising:

a rectifying section;

a first feed section for feeding a direct current;

a second feed section for feeding a direct current so as to rapidly charge the secondary battery with an electrical quantity greater than that of the first feed section; and a control section for controlling charging, performed by feeding of power from the second feed section, when a feed instruction for feeding power from the second feed section is received from the processor.

6. The feeder according to claim 5, further comprising a detection section for detecting whether or not the feeder is connected to the processor, wherein the first feed section starts feeding of power when the connection of the feeder with the processor is detected, and wherein the control section performs control for starting feeding of power from the second feed section upon reception of the feed instruction from the processor.

7. A charging system comprising:

a processor that includes a containing part for selectively containing either one of a secondary battery of a first type and a secondary battery of a second type capable of being rapidly charged with an electrical quantity greater than that of the secondary battery of the first type, and that carries out processing using, as a power source, the secondary battery contained in the containing part; and a feeder for feeding power to the processor so as to charge the secondary battery, wherein the processor includes:

means for determining whether or not the contained secondary battery needs to be charged;

battery detection means for detecting the type of the contained secondary battery when it is determined that the secondary battery needs to be charged; and transmission means for transmitting, to the feeder, a feed instruction for causing the feeder to feed power by a method corresponding to the detected type, and wherein the feeder includes means for feeding power by a method corresponding to the received feed instruction.

8. The charging system according to claim 7, wherein the processor is connectable with a feeder capable of feeding power by a method corresponding to rapid charging, and a feeder incapable of feeding power by the method corresponding to rapid charging, wherein the processor further includes device detection means for detecting a connection or disconnection state of the feeder and the type of the connected feeder, and wherein the transmission means transmits a feed instruction for performing rapid charging when the battery detection means has detected that the secondary battery of the second type is contained and the device detection means has detected that the feeder capable of feeding power by the method corresponding to rapid charging is connected.

9. The charging system according to claim 7, wherein the feeder capable of feeding power by the method corresponding to rapid charging further includes:

rectifying means;

first feed means for feeding a direct current corresponding to the first type;

second feed means for feeding a direct current corresponding to the second type; and means for controlling charging performed by feeding of power from the second feed means, and wherein the processor further includes means for controlling charging performed by feeding of power from the first feed means.

10. A processor for carrying out processing using a secondary battery as a power source, the processor comprising:

a containing part for containing either one of a secondary battery of a first type and a secondary battery of a second type capable of being rapidly charged with an electrical quantity greater than that of the secondary battery of the first type;

a connection part for connecting with a feeder for feeding power so as to charge the secondary battery;

means for determining whether or not the contained secondary battery needs to be charged;

means for detecting the type of the secondary battery when it is determined that the secondary battery needs to be charged; and means for transmitting, to the feeder, a feed instruction for causing the feeder to feed power by a method corresponding to the detected type.

11. A feeder for feeding power to a processor, which carries out processing using a secondary battery as a power source, so as to charge the secondary battery, the feeder comprising:

rectifying means;

first feed means for feeding a direct current;

second feed means for feeding a direct current so as to rapidly charge the secondary battery with an electrical quantity greater than that of the first feed means; and control means for controlling charging, performed by feeding of power from the second feed means, when a feed instruction for feeding power from the second feed means is received from the processor.

12. The feeder according to claim 11, further comprising means for detecting whether or not the feeder is connected to the processor, wherein the first feed means starts feeding of power when the connection of the feeder with the processor is detected, and wherein the control means performs control for starting feeding of power from the second feed means upon reception of the feed instruction from the processor.

\* \* \* \* \*